D. ROBINSON, Jr.
UNIVERSAL JOINT.
APPLICATION FILED MAR. 26, 1920.

1,385,713.

Patented July 26, 1921.

Inventor
David Robinson, Jr
By Whittemore Hulbert & Whittemore
Attorneys

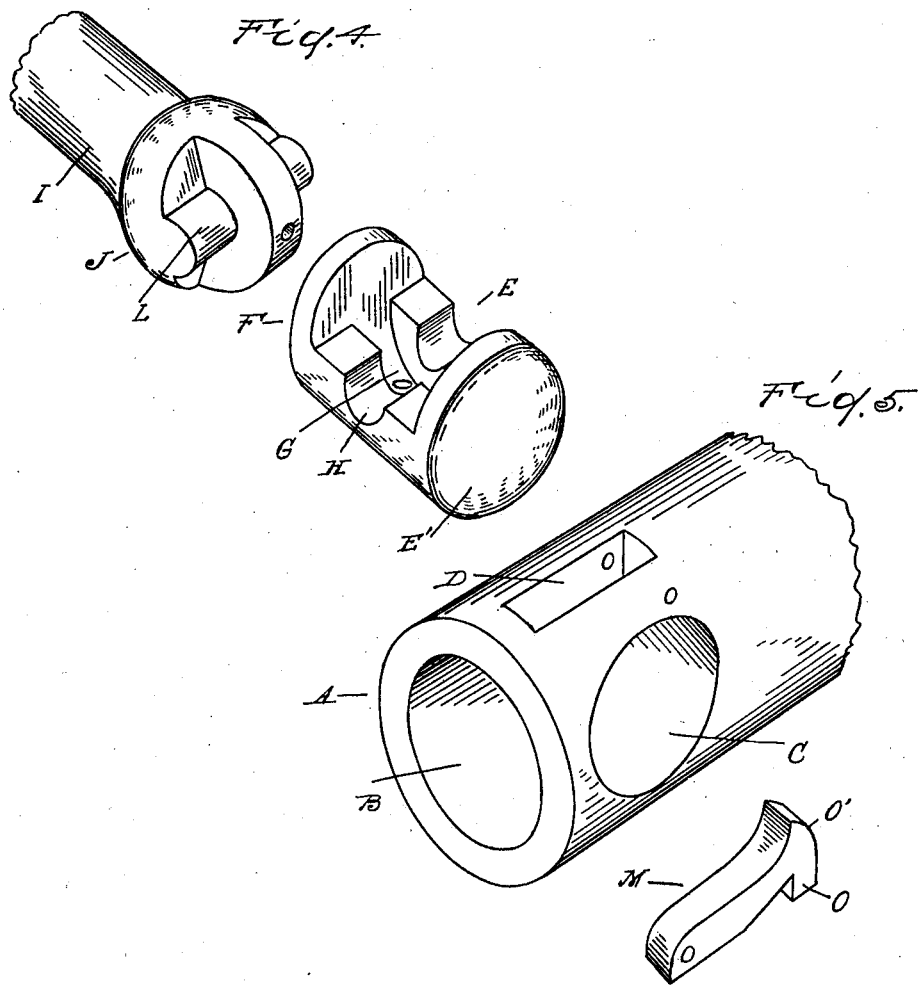

UNITED STATES PATENT OFFICE.

DAVID ROBINSON, JR., OF DETROIT, MICHIGAN.

UNIVERSAL JOINT.

1,385,713. Specification of Letters Patent. Patented July 26, 1921.

Application filed March 26, 1920. Serial No. 369,133.

*To all whom it may concern:*

Be it known that I, DAVID ROBINSON, Jr., a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints, being more particularly designed for use in the connection of rotating tools to their operating shanks, but also applicable to many other uses. It is the object of the invention to obtain a construction in which the joint can be easily and quickly assembled or disassembled, thereby facilitating the change of tools. A further object is to obtain a simple construction which can be manufactured at low cost.

In the drawings:

Figs. 4 and 5 are perspective views of coöperating members of the joint detached.

Figure 1:
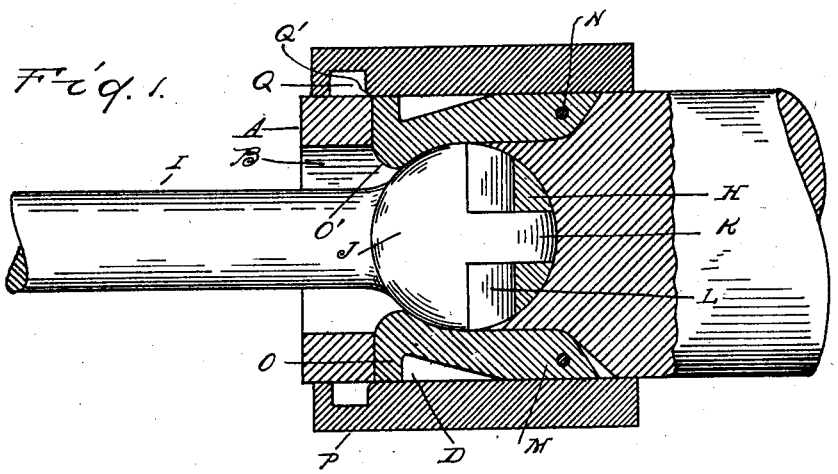
Figure 1 is a longitudinal section through the joint.
Figure 2:
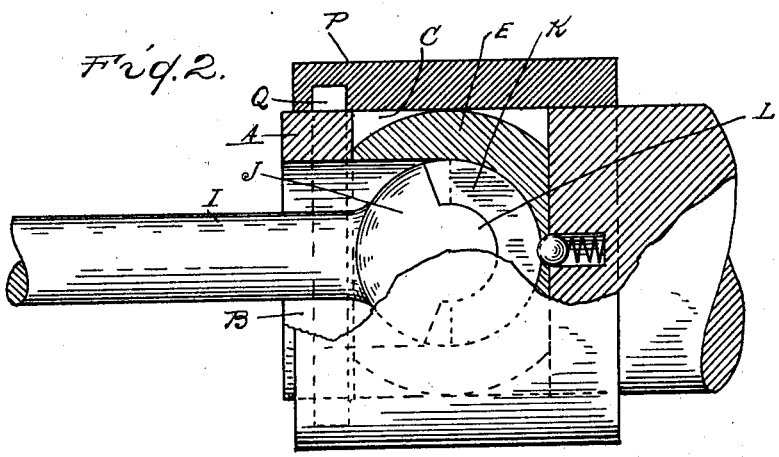
Fig. 2 is a similar view taken in a plane transverse to that of Fig. 1.
Figure 3:
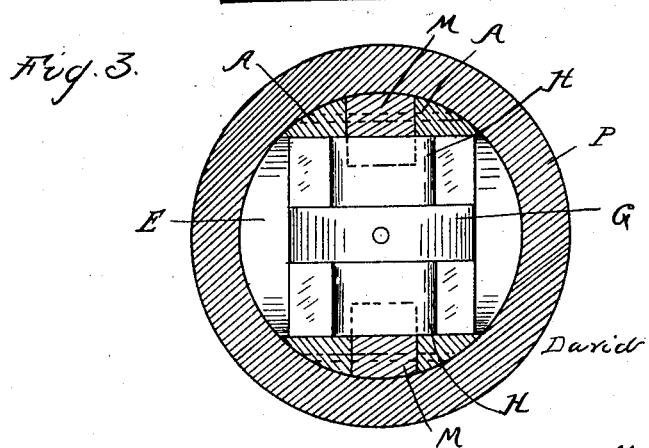
Fig. 3 is a cross-section.

A is the driving member, such, for instance, as the rotating spindle, of a drill press or other machine. This member is provided with the central cylindrical recess B in its end and with the transverse cylindrical recess C intersecting the recess B. There are also provided slots D on diametrically opposite sides of the member A and in a plane transverse to the axis of the cylindrical recess C. E is a cylindrical member fitting within the cylindrical recess C and preferably having spherical end portions E' of a radius corresponding to that of the outer surface of the member A. The member E is cut away at F on one side thereof, or about one-half of its diameter, and centrally and longitudinally of the remaining portion there is formed a segmental recess G having parallel sides. Also, there are preferably formed semi-cylindrical recesses H in these parallel sides, which are concentric with the axis of the segment G. I is the driven member, such for instance as the shank of a drill, tap, or other tool to be engaged with the spindle A. This member I is provided with a spherical end portion J of a diameter to fit within the cut-away portion F of the member E and said spherical end is itself cut-away to form a segmental portion K for fitting in the segmental portion G. On opposite sides of this segmental portion K are semi-cylindrical portions L for fitting within the semi-cylindrical recesses H and cutting away of the head J is sufficient to extend more than 180° around the axis of the portions L. M are members insertible in the slots D being preferably pivotally mounted therein at one end, as by means of the pins N, passing through alined apertures in the member A and said members M. The opposite ends of the members M are curved to fit about the spherical portion J of the member I. O are lugs extending outward from the members M, which when flush with the outer face of the member A, will hold said members M in engagement with the spherical portion J. P is a sleeve surrounding the member A and having formed therein recesses Q, which when the sleeve is adjusted longitudinally may be registered with the lugs O, permitting the member M to be swung outward on its pivot. When, however, the sleeve P has its recess Q out of registration with said lugs O, the members M will be held in position for engagement with the spherical member J.

With the construction as described, the parts may be assembled by first inserting the member E in the recess C and the members M in the slots D pivotally securing the latter by the pins N. The sleeve P is then engaged with the member A and is adjusted longitudinally thereof. When it is desired to engage the driven member I, the sleeve P is adjusted to register its recesses Q with the lugs O, whereupon the spherical member J of the member I may be inserted through the recess B, forcing outward the members M and engaging the segmental portion K and the portions L respectively with the segmental recess G and segmental bearings H. If the sleeve P is then again adjusted longitudinally, this will force the members M inward so as to close about the spherical member J and prevent its withdrawal. This movement is facilitated by beveling the lugs O, as indicated at O', and the sides of the recesses Q, as indicated at Q', so as to form in effect a cam for forcing the lugs out of the recesses.

When the parts are assembled as just described, the member I will be rotatively driven from the member A by reason of the engagement of the segmental member K with the recess G. At the same time, a limited freedom for universal movement is provided as the segment K is free to turn about its axis and that of the members L, while the member E is free to turn about its axis. Consequently, the member I while revolving is free to aline itself with the work and to be out of alinement with the axis of the member A.

What I claim as my invention is:

1. The combination with a revoluble member having an axial recess in one end thereof and a transverse cylindrical recess intersecting said axial recess, of a member formed of one piece having cylindrical portions engaging said transverse cylindrical recess and having a bearing in one side thereof concentric with an axis transverse to that of said cylindrical recess, and a second revoluble member insertible within said axial recess into engagement with the bearing in said cylindrical member.

2. The combination with a revoluble member having an axial recess in one end thereof and a transverse cylindrical recess intersecing said axial recess, of a cylindrical member engaging said transverse cylindrical recess and cut away on one side to form a bearing concentric with an axis transverse to the axis of said cylinder, a second revoluble member insertible in said axial recess into engagement with the bearing in said cylindrical member and having a segmental spherical surface opposite the surface engaging said bearing, and means secured to said first-mentioned revoluble member for engaging said segmental cylindrical surface to retain said second revoluble member in engagement therewith while permitting limited universal movement.

3. The combination with a revoluble member having an axial recess in one end thereof, of a transverse cylindrical recess intersecting said axial recess, a cylindrical member engaging said transverse cylindrical recess and cut away on one side to form a semi-cylindrical bearing concentric with an axis transverase to that of the cylinder, and a second revoluble member having a cylindrical portion at the end thereof for engaging said cylindrical bearing, said member being insertible in said axial recess into engagement with said bearing.

4. The combination with a revoluble member having an axial recess in one end thereof and a transverse cylindrical recess intersecting said axial recess, of a cylindrical member in said transverse cylindrical recess cut away on one side to substantially one-half the diameter thereof and provided with a cylindrical recess in the remaining portion concentric with an axis transverse to the axis of the cylinder, and a second revoluble member having a segmental cylindrical portion concentric with the transverse axis for engaging said cylindrical bearing in said cylindrical member and also provided with a segmental spherical portion on the opposite side from said segmental cylindrical bearing, said member being insertible through said axial recess into engagement with its bearing, and means mounted on said first-mentioned revoluble member for engaging said segmental spherical surface to retain said second revoluble member in engagement therewith.

5. The combination with a revoluble member having an axial recess in one end thereof, a transverse cylindrical recess intersecting said axial recess and a longitudinally extending slot in a plane transverse to the axis of said transverse cylindrical recess and intersecting said recess and said axial recess, a cylindrical member engaging said transverse cylindrical recess cut away on one side to substantially one-half the diameter thereof and provided with a central cylindrical recess in the remaining portion concentric with an axis transverse to that of the cylinder, a second revoluble member having at one end thereof a segmental cylindrical portion concentric with the transverse axis and engageable with said cylindrical bearing in said cylindrical member, said second revoluble member also having a segmental spherical portion opposite said segmental cylindrical portion and said member being insertible in said axial recess into engagement with the bearing in said cylinder, and a member within said longitudinal slot having a portion for projecting into said axial recess into engagement with said segmental spherical portion to hold said second revoluble member in engagement with said said first-mentioned revoluble member.

6. The combination with a revoluble member having an axial recess in one end thereof and a transverse cylindrical recess intersecting said axial recess, of a cylindrical member engaging said transverse cylindrical axis and cut away on one side to substantially one-half the diameter thereof, said member also having a segmental cylindrical bearing in the remaining portion thereof concentric with an axis transverse to that of the cylinder and provided centrally with a segmental cylindrical bearing of increased diameter concentric with the same axis, a second revoluble member having at one end thereof segmental cylindrical portions concentric with the transverse axis for engaging respectively the segmental cylindrical bearings in said cylindrical member and said second revoluble member also having a segmental spherical portion on the opposite side thereof from said segmental cylindrical bearing, said member being insertible through said axial recess into engagement with its bearings in said cylindrical member, and means mounted on said first-mentioned revoluble member for engaging said segmental spherical surface of said second-mentioned revoluble member to hold the same in engagement therewith.

7. The combination with a revoluble member having an axial recess in one end thereof, a transverse cylindrical recess intersecting said axial recess and a longitudinal slot intersecting said axial recess and transverse cylindrical recess, of a cylindrical member engaging said transverse cylindrical recess cut away on one side and provided with a segmental cylindrical bearing in the remaining portion concentric with an axis transverse to that of the cylinder, a second revoluble member having at one end thereof a segmental cylindrical portion about a transverse axis for engaging said segmental cylindrical bearing in said cylindrical member and also having a segmental spherical portion opposite said segmental cylindrical portion, a member in said longitudinal slot having an inwardly projecting portion for engaging said segmental spherical portion and also having an oppositely projecting portion, an adjustable sleeve upon said first-mentioned revoluble member for bearing against the member in said longitudinal slot to hold the inwardly projecting portion thereof in engagement with said spherical portion, said sleeve having a recess adapted for registration with the outwardly projecting portion of the member in said slot, permitting the outward movement of said member to disengage the inwardly-projecting portion thereof from said spherical portion and permitting the insertion and withdrawal of said second revoluble member from said first-mentioned revoluble member.

8. The combination with a revoluble member having an axial recess in one end thereof and a transverse cylindrical recess intersecting said axial recess and a plurality of longitudinal slots intersecting said axial recess and transverse recess, of a cylindrical member engaging said transverse cylindrical recess cut away on one side and provided in the remaining portion with a cylindrical bearing about an axis transverse to that of said cylinder, a second revoluble member having at one end thereof a segmental cylindrical portion about a transverse axis for engaging said segmental cylindrical bearing in said cylindrical member when said second revoluble member is inserted in said axial recess in said first-mentioned revoluble member, said second-mentioned revoluble member also being provided with a segmental spherical portion opposite said segmental cylindrical portion, members engaging said longitudinal slots provided with inwardly projecting portions forming bearings for engaging said spherical portion of said second revoluble member and also provided with outwardly projecting portions, a sleeve surrounding said first-mentioned revoluble member for engaging said outwardly projecting portions of the members in said slots and holding the inwardly projecting portions thereof in engagement with said segmental spherical portion, said sleeve being provided with a recess registrable with the outwardly projecting portions of the members in said slots, permitting the outward movement thereof for engagement or disengagement of said second revoluble member.

In testimony whereof I affix my signature.

DAVID ROBINSON, JUNIOR.